US010962633B2

(12) United States Patent
Zhang (10) Patent No.: US 10,962,633 B2
(45) Date of Patent: Mar. 30, 2021

(54) THREE-DIMENSIONAL SPACE DETECTION SYSTEM, POSITIONING METHOD AND SYSTEM

(71) Applicant: NOLO CO., LTD, Beijing (CN)

(72) Inventor: Daoning Zhang, Bejing (CN)

(73) Assignee: NOLO CO., LTD, Beijing (CN)

( * ) Notice: Subject to any disclaimer, the term of this patent is extended or adjusted under 35 U.S.C. 154(b) by 390 days.

(21) Appl. No.: 15/921,331

(22) Filed: Mar. 14, 2018

(65) Prior Publication Data

US 2018/0217246 A1    Aug. 2, 2018

Related U.S. Application Data

(63) Continuation of application No. PCT/CN2016/070885, filed on Jan. 14, 2016.

(30) Foreign Application Priority Data

Dec. 23, 2015 (CN) .......................... 201510977952.3

(51) Int. Cl.
*G01S 3/80* (2006.01)
*G01S 11/16* (2006.01)
(Continued)

(52) U.S. Cl.
CPC ................ *G01S 11/16* (2013.01); *G01S 5/16* (2013.01); *G01S 5/26* (2013.01); *G01S 11/14* (2013.01)

(58) Field of Classification Search
None
See application file for complete search history.

(56) References Cited

U.S. PATENT DOCUMENTS 2,548,590 A * 4/1951 Cook ................... G01B 11/046
356/637
3,590,704 A * 7/1971 Endo ...................... G03B 37/02
396/315
(Continued)

FOREIGN PATENT DOCUMENTS

| CN | 1082741 A | 2/1994 |
| CN | 1731088 A | 2/2006 |

(Continued)

OTHER PUBLICATIONS

Extended European Search Report for European Application No. 16877077.4, dated Oct. 8, 2018.
(Continued)

*Primary Examiner* — Isam A Alsomiri
*Assistant Examiner* — Jonathan D Armstrong
(74) *Attorney, Agent, or Firm* — Wolf, Greenfield & Sacks, P.C.

(57) ABSTRACT

A three-dimensional space detection system, including: a locating base station, a label device to be located, and a computing device. The locating base station synchronizes a base time point to the label device to be located, sends an ultrasonic signal to the label device to be located, rotationally sends a first laser plane signal about a first rotation axis, and rotationally sends a second laser plane signal about a second rotation axis perpendicular to the first rotation axis. The label device to be located synchronizes a base time point from the locating base station, detects the ultrasonic signal, the first laser plane signal and the second laser plane signal. The computing device determines the three-dimensional space coordinates of the label device to be located according to the time point at which the label device to be located detects the ultrasonic signal, the time point at which the label device to be located detects the first laser plane signal and the time point at which the label device to be located detects (Continued)

the second laser plane signal. The locating system enables precise indoor locating based on ultrasound and laser signals.

17 Claims, 5 Drawing Sheets

(51) Int. Cl.
*G01S 11/14* (2006.01)
*G01S 5/16* (2006.01)
*G01S 5/26* (2006.01)

(56) References Cited

U.S. PATENT DOCUMENTS

| | | | | |
|---|---|---|---|---|
| 3,897,637 | A * | 8/1975 | Genho | G01C 15/004 33/227 |
| 5,113,377 | A * | 5/1992 | Johnson | G01V 1/38 181/110 |
| 5,287,627 | A * | 2/1994 | Rando | G01B 3/00 33/227 |
| 5,493,786 | A * | 2/1996 | Thomson | G01C 15/002 33/1 G |
| 6,199,292 | B1 * | 3/2001 | Ebeling | G01B 3/12 235/472.03 |
| 6,381,006 | B1 | 4/2002 | Ranström | |
| 6,560,560 | B1 * | 5/2003 | Tachner | G01C 5/00 702/164 |
| 7,073,268 | B1 * | 7/2006 | Etter | B23D 59/002 33/286 |
| 7,086,162 | B2 * | 8/2006 | Tyroler | G01B 11/14 33/1 G |
| 7,127,821 | B1 * | 10/2006 | Weisz | G01B 11/14 33/277 |
| 7,294,822 | B2 | 11/2007 | Randall | |
| 7,325,328 | B1 * | 2/2008 | Morton | B63B 49/00 33/713 |
| 7,372,771 | B2 * | 5/2008 | Park | G01C 15/002 367/99 |
| 2002/0008870 | A1 | 1/2002 | Beliveau et al. | |
| 2006/0220910 | A1 * | 10/2006 | Becker | G06K 9/00805 340/932.2 |
| 2011/0274343 | A1 * | 11/2011 | Krishnaswamy | G06T 17/00 382/154 |
| 2013/0080111 | A1 * | 3/2013 | Dunik | G06T 7/70 702/152 |
| 2016/0231420 | A1 * | 8/2016 | Kryvobok | G01S 7/4817 |

FOREIGN PATENT DOCUMENTS

| | | |
|---|---|---|
| CN | 102121827 A | 7/2011 |
| CN | 102384717 A | 3/2012 |
| CN | 102425990 A | 4/2012 |
| CN | 102636774 A * | 8/2012 |
| CN | 102636774 A | 8/2012 |
| CN | 103278132 A | 9/2013 |
| CN | 103760517 A | 4/2014 |
| CN | 104079916 A | 10/2014 |
| CN | 105157697 A | 12/2015 |
| CN | 106525045 A | 3/2017 |
| EP | 1 843 233 A1 | 10/2007 |
| EP | 16877077 | 10/2018 |
| WO | WO 2005/089488 A2 | 9/2005 |

OTHER PUBLICATIONS

Deyle, Valve's "Lighthouse" Tracking System May Be Big News for Robotics. May 17, 2015. 8 pages. http://www.hizook.com/blog/2015/05/17/valves-lighthouse-tracking-system-may-be-big-news-robotics [last accessed Apr. 18, 2019].

Yang, 2.2.1 Photoelectric Scanning for Angle Measurement and 2.3.1 Whole Schema of the Emitting Station. Chinese Doctoral Dissertation Engineering Science and Technology. May 15, 2012. 21 pages.

* cited by examiner

THREE-DIMENSIONAL SPACE DETECTION SYSTEM, POSITIONING METHOD AND SYSTEM

RELATED APPLICATIONS

The present application claims the benefit under 35 U.S.C. § 365(c) and § 120 and is a continuation (CON) of PCT International Application No. PCT/CN2016/070885 filed Jan. 14, 2016, and titled "THREE-DIMENSIONAL SPACE DETECTION SYSTEM, POSITIONING METHOD AND SYSTEM" which claims priority under 35 U.S.C. § 119(a)-(d) or 35 U.S.C. § 365(b) to Chinese application number 201510977952.3, filed on Dec. 23, 2015, and titled "THREE-DIMENSIONAL SPACE DETECTION SYSTEM, POSITIONING METHOD AND SYSTEM." Each of the above-identified applications is hereby incorporated by reference in its entirety.

TECHNICAL FIELD

This disclosure relates to, but not limited to, locating technology, and more particularly to a three-dimensional space detection system, locating method and system.

BACKGROUND

With the development of mobile devices and network technologies, location services are becoming more and more important in people's lives. Current locating technology can be divided into outdoor locating and indoor locating according to different locating areas. Among them, outdoor locating is mainly achieved through the satellite locating system, and the related outdoor locating technology can well meet the needs of outdoor locating.

However, outdoor locating technology when used in indoor locating, due to locating time, locating accuracy and indoor complex environment and other conditions, can not meet the needs of users. In order to improve accuracy of indoor locating, indoor locating systems such as the Vicon/Optitrack optical motion capture system and the 3D laser radar SLAM are brought about in the related art. The Vicon/Optitrack optical motion capture system needs to be applied to a field of view overlap of four or more than four infrared cameras. The required equipment configuration is complicated and the cost is very high, about RMB several hundred thousand yuan. And, the optical motion capture system can not locate the indoor geographical coordinates of the terminal. The 3D laser radar SLAM needs the map of the surrounding environment to be built up and the cost is also very high, about RMB tens of thousands yuan.

Thus, the existing indoor locating technology does not apply to locating of consumer electronics.

This section provides background information related to the present disclosure which is not necessarily prior art.

SUMMARY

The following is an overview of the subject matter described in detail in this disclosure. This summary is not intended to limit the scope of the claims.

The embodiments of the present disclosure provide a three-dimensional space detection system, locating method and system, which can provide higher indoor locating accuracy and achieve simple implementation.

An embodiment of the present disclosure provides a three-dimensional space detection system comprising: a locating base station and a label device to be located, wherein the locating base station is configured to synchronize a base time point to the label device to be located, send an ultrasonic signal to the label device to be located, rotationally send a first laser plane signal about a first rotation axis, and rotationally send a second laser plane signal about a second rotation axis to the label device to be located, wherein the first rotation axis and the second rotation axis are perpendicular to each other; the label device to be located is configured to synchronize a base time point from the locating base station, detect the ultrasonic signal, the first laser plane signal and the second laser plane signal.

In an embodiment, the locating base station comprises: a first synchronization apparatus, configured to synchronize the base time point to the label device to be located; a first rotating laser plane transmitter configured to rotationally sending the first laser plane signal about the first rotation axis; a second rotating laser plane transmitter configured to rotationally send the second laser plane signal about the second rotation axis; an ultrasound transmitter, configured to send the ultrasonic signal.

Optionally, the ultrasonic transmitter is located at the intersection of the first rotation axis and the second rotation axis.

In an embodiment, the label device to be located comprises: a second synchronization apparatus configured to synchronize the base time point from the locating base station; a photoelectric sensing circuit configured to detect the first laser plane signal and the second laser plane signal sent by the locating base station; an ultrasonic receiver configured to detect the ultrasonic signal sent by the locating base station.

An embodiment of this disclosure further provides a three-dimensional space locating method based on the above three-dimensional space detection system, comprising:

after the locating base station and the label device to be located synchronize the base time point, and the label device to be located detects the first laser plane signal, the second laser plane signal and the ultrasonic signal, determining a first rotation angle and a second rotation angle according to a first reference time point at which the locating base station sends the first laser plane signal, a second reference time point at which the locating base station sends the second laser plane signal, a first time point at which the label device to be located detects the first laser plane signal, and a second time point at which the label device to be located detects the second laser plane signal, wherein the first rotation angle is an angle of the first laser plane signal with respect to a plane defined by the first rotation axis and the second rotation axis at the first time point, the second rotation angle is an angle of the second laser plane signal with respect to the plane defined by the first rotation axis and the second rotation axis at the second time point, the first reference time point is a time point when an angel of the first laser plane signal sent by the locating base station with respect to the plane defined by the first rotation axis and the second rotation axis is a first reference angle, and the second reference time point is a time point when an angle of the second laser plane signal sent by the locating base station with respect to the plane defined by the first rotation axis and the second rotation axis is a second reference angle;

determining a distance between the label device to be located and the locating base station according to a sending time point at which the locating base station sends the ultrasonic signal and a time point at which the label device to be located detects the ultrasonic signal; and determining three-dimensional coordinates of the label device to be located in a three-dimensional measurement coordinate system according to the first rotation angle, the second rotation angle, and the distance.

Optionally, the determining the three-dimensional coordinates of the label device to be located in a three-dimensional measurement coordinate system according to the first rotation angle, the second rotation angle, and the distance includes:

when the three-dimensional measurement coordinate system is a Cartesian coordinate system, the first rotation axis is the X-axis, and the second rotation axis is the Y-axis, determining three-dimensional coordinates of the label device to be located in a three-dimensional measurement coordinate system according to the following formula:

$$X_0^2 + Y_0^2 + Z_0^2 = L^2$$

$$Y_0 \times \tan \alpha = X_0 \times \tan \beta = Z_0$$

wherein $(X_0, Y_0, Z_0)$ represents the three-dimensional coordinates of the label device to be located in the three-dimensional measurement coordinate system, L is the distance between the label device to be located and the locating base station, $\alpha$ is the first rotation angle, and $\beta$ is the second rotation angle.

Optionally, the determining the first rotation angle and the second rotation angle according to the first reference time point at which the locating base station sends the first laser plane signal, the second reference time point at which the locating base station sends the second laser plane signal, the first time point at which the label device to be located detects the first laser plane signal, and the second time point at which the label device to be located detects the second laser plane signal comprises:

determining a relationship between the first time point and the first reference time point according to the first reference time point at which the locating base station sends the first laser plane signal and the first time point at which the label device to be located detects the first laser plane signal, and determining the first rotation angle according to the relationship between the first time point and the first reference time point and the first reference angle corresponding to the first reference time point;

determining a relationship between the second time point and the second reference time point according to the second reference time point at which the locating base station sends the second laser plane signal and the second time point at which the label device to be located detects the second laser plane signal, and determining the second rotation angle according to the relationship between the second time point and the second reference time point and the second reference angle corresponding to the second reference time point.

Optionally, the determining the distance between the label device to be located and the locating base station according to the sending time point at which the locating base station sends the ultrasonic signal and the time point at which the label device to be located detects the ultrasonic signal comprises:

determining transmission time length of the ultrasonic signal from the locating base station to the label device to be located according to a sending time point at which the locating base station sends the ultrasonic signal and a time point at which the label device to be located detects the ultrasonic signal, and determining the distance between the label device to be located and the locating base station according to the transmission time length and transmission speed of sound in air.

An embodiment of this disclosure further provides a three-dimensional space locating system, comprising: a computing device; and the above three-dimensional space detection system, wherein the computing device is configured to: after the locating base station and the label device to be located synchronize the base time point, and the label device to be located detects the first laser plane signal, the second laser plane signal and the ultrasonic signal, determine a first rotation angle and a second rotation angle according to a first reference time point at which the locating base station sends the first laser plane signal, a second reference time point at which the locating base station sends the second laser plane signal, a first time point at which the label device to be located detects the first laser plane signal, and a second time point at which the label device to be located detects the second laser plane signal, wherein the first rotation angle is an angle of the first laser plane signal with respect to a plane defined by the first rotation axis and the second rotation axis at the first time point, the second rotation angle is an angle of the second laser plane signal with respect to the plane defined by the first rotation axis and the second rotation axis at the second time point, the first reference time point is a time point when an angel of the first laser plane signal sent by the locating base station with respect to the plane defined by the first rotation axis and the second rotation axis is a first reference angle, and the second reference time point is a time point when an angle of the second laser plane signal sent by the locating base station with respect to the plane defined by the first rotation axis and the second rotation axis is a second reference angle;

determine a distance between the label device to be located and the locating base station according to a sending time point at which the locating base station sends the ultrasonic signal and a time point at which the label device to be located detects the ultrasonic signal; and determine three-dimensional coordinates of the label device to be located in a three-dimensional measurement coordinate system according to the first rotation angle, the second rotation angle, and the distance.

Optically, the computing device is configured to determine the three-dimensional coordinates of the label device to be located in a three-dimensional measurement coordinate system according to the first rotation angle, the second rotation angle, and the distance in a manner of:

when the three-dimensional measurement coordinate system is a Cartesian coordinate system, the first rotation axis is the X-axis, and the second rotation axis is the Y-axis, determining the three-dimensional coordinates of the label device to be located in a three-dimensional measurement coordinate system according to the following formula:

$$X_0^2 + Y_0^2 + Z_0^2 = L^2$$

$$Y_0 \times \tan \alpha = X_0 \times \tan \beta = Z_0$$

wherein $(X_0, Y_0, Z_0)$ represents the three-dimensional coordinates of the label device to be located in the three-dimensional measurement coordinate system, L is the distance between the label device to be located and the locating base station, $\alpha$ is the first rotation angle, and $\beta$ is the second rotation angle.

Optionally, the computing device is configured to determine the first rotation angle and the second rotation angle according to the first reference time point at which the locating base station sends the first laser plane signal, the second reference time point at which the locating base station sends the second laser plane signal, the first time point at which the label device to be located detects the first laser plane signal, and the second time point at which the label device to be located detects the second laser plane signal in a manner of:

determining a relationship between the first time point and the first reference time point according to the first reference time point at which the locating base station sends the first laser plane signal and the first time point at which the label device to be located detects the first laser plane signal, and determining the first rotation angle according to the relationship between the first time point and the first reference time point and the first reference angle corresponding to the first reference time point; and determining a relationship between the second time point and the second reference time point according to the second reference time point at which the locating base station sends the second laser plane signal and the second time point at which the label device to be located detects the second laser plane signal, and determining the second rotation angle according to the relationship between the second time point and the second reference time point and the second reference angle corresponding to the second reference time point.

Optionally, the computing device is configured to determine the distance between the label device to be located and the locating base station according to the sending time point at which the locating base station sends the ultrasonic signal and the time point at which the label device to be located detects the ultrasonic signal in a manner of:

determining transmission time length of the ultrasonic signal from the locating base station to the label device to be located according to a sending time point at which the locating base station sends the ultrasonic signal and a time point at which the label device to be located detects the ultrasonic signal, and determining the distance between the label device to be located and the locating base station according to the transmission time length and transmission speed of sound in air.

An embodiment of this disclosure further provides a computer storage medium having stored therein computer-executable instructions for performing the above mentioned method.

In an embodiment of the present disclosure, the locating base station synchronizes a base time point to the label device to be located, sends an ultrasonic signal to the label device to be located, rotationally sends a first laser plane signal about a first rotation axis, and rotationally sends a second laser plane signal about a second rotation axis perpendicular to the first rotation axis to the label device to be located, and the label device to be located synchronizes the base time point from the locating base station, detects the ultrasonic signal, the first laser plane signal, and the second laser plane signal, and determines three-dimensional coordinates of the label device to be located in a three-dimensional measurement coordinate system by computation process according to a first reference time point at which the locating base station sends the first laser plane signal, a second reference time point at which the locating base station sends the second laser plane signal, a sending time point at which the locating base station sends the ultrasonic signal, a first time point at which the label device to be located detects the first laser plane signal, a second time point at which the label device to be located detects the second laser plane signal, a time point at which the label device to be located detects the ultrasonic signal. In this way, in an embodiment of the present disclosure, indoor locating can be performed based on the ultrasonic wave and the laser signal, and the locating accuracy is high. Moreover, an embodiment of the present disclosure has lower cost, and are easy to be miniaturized in the design of the label device to be located, and advantageously used in scenarios that are sensitive to volume or weight, such in a small UAV.

This section provides a summary of various implementations or examples of the technology described in the disclosure, and is not a comprehensive disclosure of the full scope or all features of the disclosed technology.

Other aspects will become apparent upon reading and understanding the drawings and detailed description.

DETAILED DESCRIPTION

The embodiments of the present disclosure are described in detail below with reference to the accompanying drawings. It should be understood that the embodiments described below are merely used for describing and explaining the present disclosure, and are not intended to limit the present disclosure.

An embodiment of the present disclosure provides a three-dimensional space detection system, including: a locating base station and a label device to be located, wherein the locating base station is configured to synchronize a base time point to the label device to be located, send an ultrasonic signal to the label device to be located, rotationally send a first laser plane signal about a first rotation axis, and rotationally send a second laser plane signal about a second rotation axis to the label device to be located, and the label device to be located is configured to synchronize a base time point from the locating base station, detect the ultrasonic signal, the first laser plane signal and the second laser plane signal, wherein the first rotation axis and the second rotation axis are perpendicular to each other.

Figure 1:
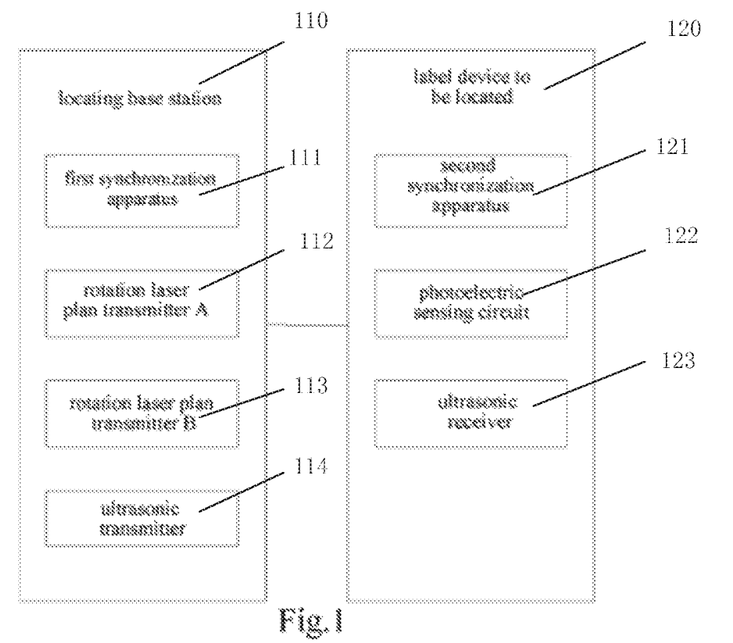
FIG. 1 is a schematic diagram of a three-dimensional space detection system according to an embodiment of the present disclosure.

FIG. 1 is a schematic diagram of a three-dimensional space detection system according to an embodiment of the present disclosure. As shown in FIG. 1, the three-dimensional space detection system provided in this embodiment includes a locating base station 110 and a label device to be located 120. There may be at least one label devices to be located. That is, one locating base station can provide locating service to at least one label devices to be located.

As shown in FIG. 1, the locating base station 110 includes a first synchronization apparatus 111, two rotating laser plane transmitters 112, 113 (rotating laser plane transmitters A and B), and an ultrasonic transmitter 114, wherein the first synchronizing apparatus is configured to synchronize the base time point to the label device to be located; the rotating laser plane transmitter A is configured to rotationally send a first laser plane signal about a first rotation axis; the rotating laser plane transmitter B is configured to rotationally send a second laser plane signal about a second rotation axis perpendicular to the first rotation axis; and the ultrasonic transmitter is configured to send the ultrasonic signal.

Optionally, the first rotation axis and the second rotation axis can intersect. However, this embodiment is not limited hereto. In practical applications, the first rotation axis may not intersect with the second rotation axis. For example, a vertical distance between a pair of parallel planes defined by the first rotation axis and the second rotation axis is within a corresponding predetermined range.

Optionally, the ultrasound transmitter is located at the intersection of the first rotation axis and the second rotation axis. However, this embodiment is not limited hereto. In practical applications, the ultrasonic transmitter may be located near the intersection of the first rotation axis and the second rotation axis (for example, within a predetermined sphere whose center is the intersection). In addition, when the first rotation axis does not intersect the second rotation axis, the ultrasonic transmitter may be located at or near a first intersection (for example, within a predetermined sphere whose center is the intersection), wherein the first intersection is an intersection of a straight line perpendicular to the first rotation axis and parallel to the second rotation axis and the first rotation axis, or, the ultrasonic transmitter may be located at or near the second intersection (for example, within a predetermined sphere whose center is the intersection), wherein the second intersection is an intersection of a straight line perpendicular to the second rotation axis and parallel to the first rotation axis and the second rotation axis.

Optionally, the first synchronization apparatus is a radio communication circuit. However, this embodiment is not limited hereto. In other embodiments, the first synchronization apparatus may also be a light emitting diode (LED), which sends the optical signal to synchronize the time.

As shown in FIG. 1, the label device to be located 120 includes: a second synchronization apparatus 121, a photoelctric sensing circuit 122 and an ultrasonic receiver 123, wherein the second synchronization apparatus is configured to synchronize the base time point from the locating base station; the photoelectric sensing circuit is configured to detect the first laser plane signal and the second laser plane signal sent by the locating base station; and the ultrasonic receiver is configured to detect the ultrasonic signal sent by the locating base station.

Optionally, the second synchronization apparatus is a radio communication circuit. However, this embodiment of the present disclosure is not limited hereto. In other embodiments, the second synchronization apparatus may also receive the optical signal for time synchronization. It should be noted that, the first synchronizing apparatus needs to correspond to the second synchronizing apparatus. For example, when the first synchronizing apparatus is a radio communication circuit, the second synchronizing apparatus is also a radio communication circuit. In other words, the first synchronization apparatus and the second synchronization apparatus adopt a corresponding signal transmission and signal detection technology to achieve time synchronization between the locating base station and the label device to be located.

Optionally, when the 3D space detection system is in operation, the first synchronization apparatus of the locating base station synchronizes the base time point to the label device to be located. The laser of the rotating laser plane transmitter of the locating base station is turned on, and the motor bracket inside the locating base station drives a rotation head of the laser plane transmitter to rotate, continuously rotationally transmitting a laser plane signal to the surrounding space. The ultrasonic transmitter of the locating base station continuously transmits an ultrasonic signal to the surrounding space, e.g. with a pulse frequency of 10 Hz and a modulation frequency of 40 KHz. In this way, the locating base station can provide the label device to be located with locating data with high precision, high frequency and low delay.

At the same time, the second synchronizing apparatus of the label device to be located synchronizes the base time point from the first synchronizing device. When the photoelectric sensor circuit is swept by the laser plane signal, the photoelectric sensor circuit records the time point of being swept. When the ultrasonic receiver detects the ultrasonic signal, he ultrasonic receiver records the time point of detecting the ultrasonic signal.

Figure 2:
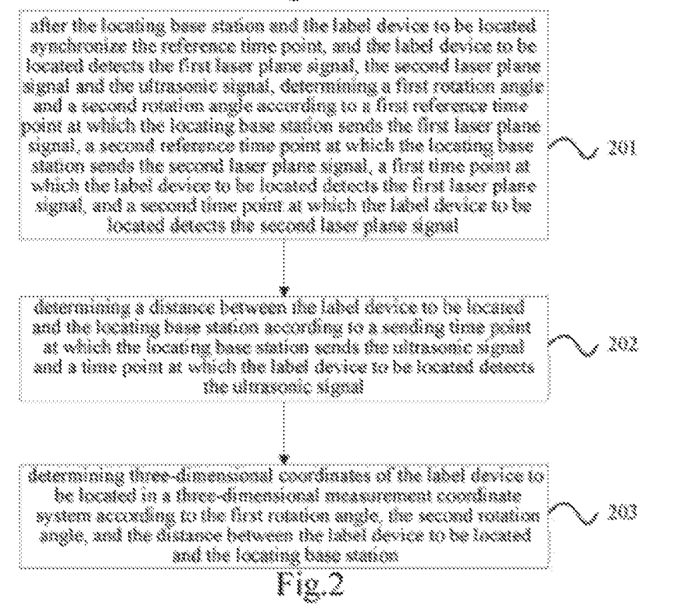
FIG. 2 is a flow chart of a three-dimensional space locating method according to an embodiment of the present disclosure.

In addition, an embodiment of the present disclosure further provides a three-dimensional space locating method. FIG. 2 is a flowchart of a three-dimensional space locating method according to an embodiment of the present disclosure. As shown in FIG. 2, the three-dimensional space locating method according to this embodiment includes the following steps:

Step 201: after the locating base station and the label device to be located synchronize the base time point, and the label device to be located detects the first laser plane signal, the second laser plane signal and the ultrasonic signal, determining a first rotation angle and a second rotation angle according to a first reference time point at which the locating base station sends the first laser plane signal, a second reference time point at which the locating base station sends the second laser plane signal, a first time point at which the label device to be located detects the first laser plane signal, and a second time point at which the label device to be located detects the second laser plane signal.

The first rotation angle is an angle of the first laser plane signal with respect to a plane defined by the first rotation axis and the second rotation axis at the first time point, the second rotation angle is an angle of the second laser plane signal with respect to the plane defined by the first rotation axis and the second rotation axis at the second time point, the first reference time point is a time point when an angel of the first laser plane signal sent by the locating base station with respect to the plane defined by the first rotation axis and the second rotation axis is a first reference angle, and the second reference time point is a time point when an angle of the second laser plane signal sent by the locating base station with respect to the plane defined by the first rotation axis and the second rotation axis is a second reference angle.

Optionally, by synchronizing the base time point between the locating base station and the label device to be located, the clock synchronization between the locating base station and the label device to be synchronized is assured to ensure that subsequent computation is based on the same reference.

Optionally, relationship between the first time point and the first reference time point is determined according to the first reference time point at which the locating base station sends the first laser plane signal and the first time point at which the label device to be located detects the first laser plane signal, and the first rotation angle is determined according to the relationship between the first time point and the first reference time point and the first reference angle corresponding to the first reference time point;

Relationship between the second time point and the second reference time point is determined according to the second reference time point at which the locating base station sends the second laser plane signal and the second time point at which the label device to be located detects the second laser plane signal, and the second rotation angle is determined according to the relationship between the second time point and the second reference time point and the second reference angle corresponding to the second reference time point.

Optionally, the first reference time point is equal to a second reference time point, and the first reference angle is equal to the second reference angle. However, this embodiment is not limited hereto.

In this embodiment, it should be noted that the plane defined by the first rotation axis and the second rotation axis includes: when the first rotation axis and the second rotation axis can intersect, the plane uniquely defined by the first rotation axis and the second rotation axis; when the first rotation axis and the second rotation axis do not intersect, a pair of parallel planes defined by a first rotation axis and a second rotation axis.

Step 202: determining a distance between the label device to be located and the locating base station according to a sending time point at which the locating base station sends the ultrasonic signal and a time point at which the label device to be located detects the ultrasonic signal.

Optionally, the step includes determining transmission time length of the ultrasonic signal from the locating base station to the label device to be located according to a sending time point at which the locating base station sends the ultrasonic signal and a time point at which the label device to be located detects the ultrasonic signal, and determining the distance between the label device to be located and the locating base station according to the transmission time length and transmission speed of sound in air.

Step 203: determining three-dimensional coordinates of the label device to be located in a three-dimensional measurement coordinate system according to the first rotation angle, the second rotation angle, and the distance between the label device to be located and the locating base station.

In an embodiment, the step includes, when the three-dimensional measurement coordinate system is a Cartesian coordinate system, the first rotation axis is the X-axis, and the second rotation axis is the Y-axis, determining the three-dimensional coordinates of the label device to be located in a three-dimensional measurement coordinate system according to the following formula:

$$X_0^2+Y_0^2+Z_0^2=L^2$$

$$Y_0 \times \tan \alpha = X_0 \times \tan \beta = Z_0$$

wherein $(X_0, Y_0, Z_0)$ represents the three-dimensional coordinates of the label device to be located in the three-dimensional measurement coordinate system, L is the distance between the label device to be located and the locating base station, $\alpha$ is the first rotation angle, $\beta$ is the second rotation angle.

Figure 3:
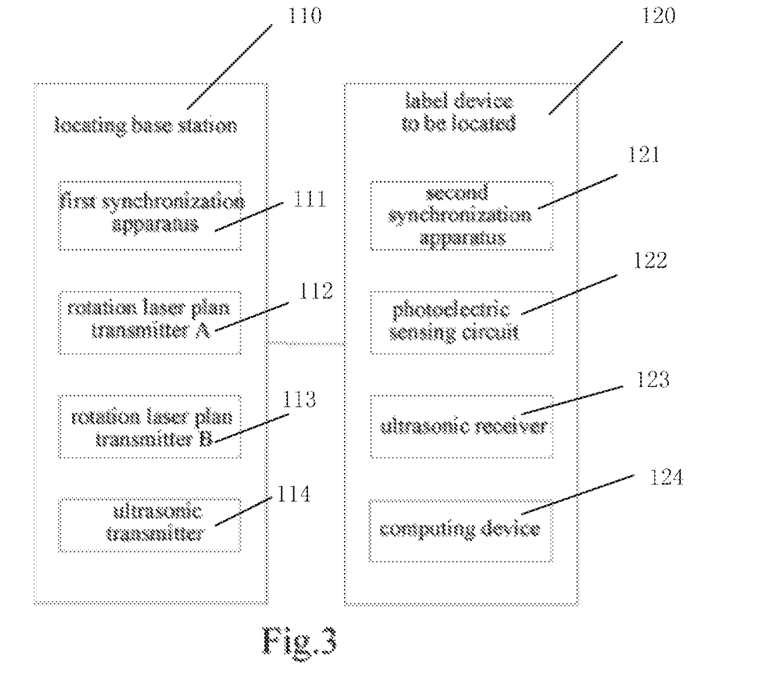
FIG. 3 is a schematic diagram of a three-dimensional space locating system according to an embodiment of the present disclosure.

Further, as shown in FIG. 3, an embodiment of this disclosure provides a three-dimensional space locating system, including: a computing device 124; and the above three-dimensional space detection system, wherein the computing device is configured to: after the locating base station and the label device to be located synchronize the base time point, and the label device to be located detects the first laser plane signal, the second laser plane signal and the ultrasonic signal, determine a first rotation angle and a second rotation angle according to a first reference time point at which the locating base station sends the first laser plane signal, a second reference time point at which the locating base station sends the second laser plane signal, a first time point at which the label device to be located detects the first laser plane signal, and a second time point at which the label device to be located detects the second laser plane signal, wherein the first rotation angle is an angle of the first laser plane signal with respect to a plane defined by the first rotation axis and the second rotation axis at the first time point, the second rotation angle is an angle of the second laser plane signal with respect to the plane defined by the first rotation axis and the second rotation axis at the second time point, the first reference time point is a time point when an angel of the first laser plane signal sent by the locating base station with respect to the plane defined by the first rotation axis and the second rotation axis is a first reference angle, and the second reference time point is a time point when an angle of the second laser plane signal sent by the locating base station with respect to the plane defined by the first rotation axis and the second rotation axis is a second reference angle; determine a distance between the label device to be located and the locating base station according to a sending time point at which the locating base station sends the ultrasonic signal and a time point at which the label device to be located detects the ultrasonic signal; and determine three-dimensional coordinates of the label device to be located in a three-dimensional measurement coordinate system according to the first rotation angle, the second rotation angle, and the distance.

In an embodiment, the computing device is configured to determine the three-dimensional coordinates of the label device to be located in a three-dimensional measurement coordinate system according to the first rotation angle, the second rotation angle, and the distance in a manner of:

when the three-dimensional measurement coordinate system is a Cartesian coordinate system, the first rotation axis is the X-axis, and the second rotation axis is the Y-axis, determining the three-dimensional coordinates of the label device to be located in a three-dimensional measurement coordinate system according to the following formula:

$$X_0^2+Y_0^2+Z_0^2=L^2$$

$$Y_0 \times \tan \alpha = X_0 \times \tan \beta = Z_0$$

wherein $(X_0, Y_0, Z_0)$ represents the three-dimensional coordinates of the label device to be located in the three-dimensional measurement coordinate system, L is the distance between the label device to be located and the locating base station, $\alpha$ is the first rotation angle, $\beta$ is the second rotation angle.

In an embodiment, the computing device is configured to determine the first rotation angle and the second rotation angle according to the first reference time point at which the locating base station sends the first laser plane signal, the second reference time point at which the locating base station sends the second laser plane signal, the first time point at which the label device to be located detects the first laser plane signal, and the second time point at which the label device to be located detects the second laser plane signal in a manner of:

determining a relationship between the first time point and the first reference time point according to the first reference time point at which the locating base station sends the first laser plane signal and the first time point at which the label device to be located detects the first laser plane signal, and determining the first rotation angle according to the relationship between the first time point and the first reference time point and the first reference angle corresponding to the first reference time point; and determining a relationship between the second time point and the second reference time point according to the second reference time point at which the locating base station sends the second laser plane signal and the second time point at which the label device to be located detects the second laser plane signal, and determining the second rotation angle according to the relationship between the second time point and the second reference time point and the second reference angle corresponding to the second reference time point.

In an embodiment, the determining device is configured to determine the distance between the label device to be located and the locating base station according to the sending time point at which the locating base station sends the ultrasonic signal and the time point at which the label device to be located detects the ultrasonic signal in a manner of:

determining transmission time length of the ultrasonic signal from the locating base station to the label device to be located according to a sending time point at which the locating base station sends the ultrasonic signal and a time point at which the label device to be located detects the ultrasonic signal, and determining the distance between the label device to be located and the locating base station according to the transmission time length and transmission speed of sound in air.

In an embodiment, the computing device is disposed in e.g. the label device to be located. In particular, when the label device to be located detects the first laser plane signal, the second laser plane signal, and the ultrasonic signal, the label device to be located records the time point at which each signal is detected. Accordingly, the computing device respectively calculates the first rotation angle, the second rotation angle and the distance between the locating base station and the label device to be located, and then calculates the three-dimensional coordinates of the label device to be located in the three-dimensional measurement coordinate system according to the first rotation angle, the second rotation angle and the distance between the locating base station and the label device to be located.

In an embodiment, the computing device is disposed in e.g. a locating base station. In particular, when the label device to be located detects the first laser plane signal, the second laser plane signal and the ultrasonic signal, the label device to be located records the time point at which each signal is detected, and sends the recorded time point at which each signal is detected to the locating base station. Then, the computing device calculates the first rotation angle, the second rotation angle, and the distance between the label device to be located and the locating base station according to the base time point and the time point at which each signal is detected by the label device to be located. Then, the computing device calculates, according to the first rotation angle, the second rotation angle, and the distance between the label device to be located and the locating base station, the three-dimensional coordinates of the label device to be located in the three-dimensional measurement coordinates. And then, the locating base station may send the calculated three-dimensional coordinates to the label device to be located.

However, the present disclosure is not limited hereto. In other embodiments, the computing device may also be disposed in other devices independent of the locating base station and the label device to be located.

Figure 4:
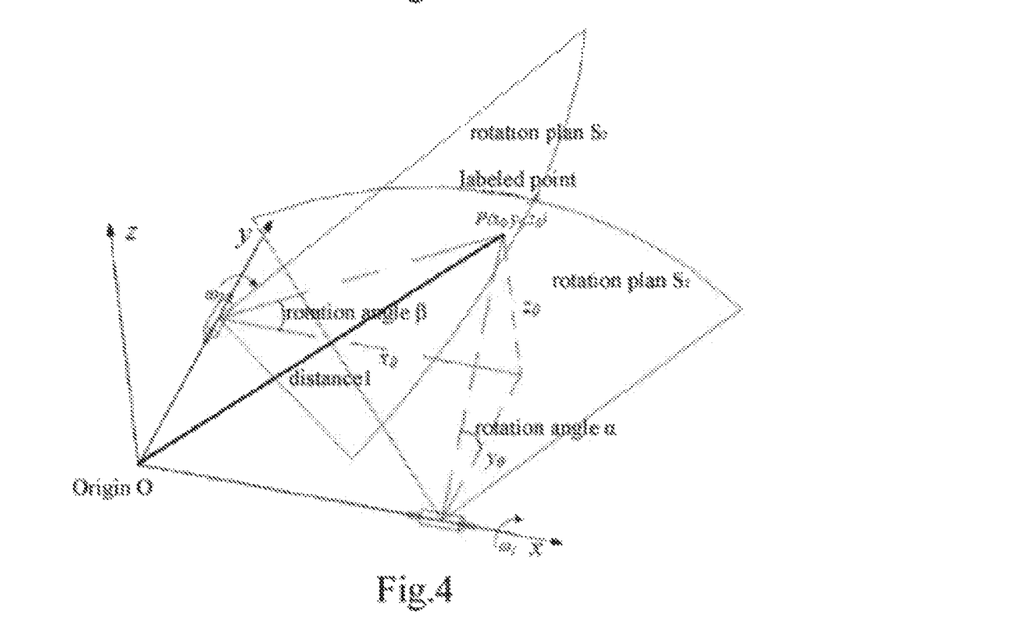
FIG. 4 is a schematic diagram of a three-dimensional space locating method according to an embodiment of the present disclosure.

FIG. 3 is a schematic diagram of a three-dimensional locating system according to an embodiment of the present disclosure. As shown in FIG. 3, the computing device is e.g. disposed in a label device to be located. FIG. 4 is a principle diagram of a three-dimensional locating method provided by an embodiment of the present disclosure.

Next, with reference to FIG. 3 and FIG. 4, the three-dimensional space locating method provided by an embodiment of the present disclosure is described in detail by taking the situation in which the computing device is disposed in the label device to be located as an example.

As shown in FIG. 4, description is given by taking the three-dimensional measurement coordinate system as a Cartesian coordinate system, wherein, the first rotation axis is the X axis, the second rotation axis is the Y axis, and the position of the ultrasonic transmitter of the locating base station is the origin O of the three-dimensional measurement coordinate system. However, this embodiment is not limited hereto. In practical applications, the location where the locating base station is located is, for example, the origin O (in this case, the location of the ultrasound transmitter may be located near the origin O). The rotating laser plane transmitter A of the locating base station rotationally sends a first laser plane signal about the X axis with rotation speed of e.g. w1. The rotating laser plane transmitter B of the locating base station rotationally sends a second laser plane signal about the Y axis with rotation speed of e.g. w2. The plane defined by the X and Y axes is the XOY plane. However, this embodiment is not limited hereto. In practice application, the rotating laser plane transmitter A of the locating base station rotationally transmits the first laser plane signal, for example, about a first rotation axis parallel to the X axis, and the rotation laser plane transmitter B of the locating base station rotationally sends the second laser plane signal about the Y axis (the second rotation axis), the first rotation axis is perpendicular to, and does not intersect the Y axis. In this case, the first rotation axis and the Y axis can define a pair of parallel planes (including an XOY plane and a plane parallel to the XOY plane). Or, the rotating laser plane transmitter A of the locating base station rotationally sends the first laser plane signal about the X axis (first rotation axis), and the rotating laser plane transmitter B of the locating base station rotationally sends the second laser plane signal about e.g. the second rotation axis which is parallel to the Y axis, wherein the second rotation axis is perpendicular to, and and does not intersect the X axis. In this case, the second rotation axis and the X axis can define a pair of parallel planes (including an XOY plane and a plane parallel to the XOY plane). The vertical distance between the pair of parallel planes is, for example, within a predetermined range.

Herein, the locating base station synchronizes the base time point to the label device to be located via the first synchronization apparatus (such as a radio communication circuit). Specifically, by synchronizing the base time point, it is ensured that the locating base station and the label device to be located keep clock synchronization so as to assure that subsequent time point information is based on the same reference. However, this embodiment is not limited hereto. The locating base station can also synchronize the base time point to the label device to be located by generating an optical signal.

Herein, the locating base station further transmits a base time point at the first laser plane signal is sent and a base time point at which the second laser plane signal is sent to the label device to be located via the first synchronization apparatus (such as a radio communication circuit). Herein, the time point at which the rotating laser plane transmitter A of the locating base station transmits the first laser plane signal at the first reference angle is referred to as a first reference time point, and the time point at which the rotating laser plane transmitter B of the locating base station transmits the second laser plane signal at the second reference angle is referred to as a second reference time point. The first reference time point and the second reference time point are, for example, the same time point or different time points, which is not limited in an embodiment of the present disclosure. The first reference angle and the second reference angle may be the same or different. For example, both the first reference angle and the second reference angle are 0, that is, the angle of the laser plane signal sent by the rotating laser plane transmitter A (or B) with respect to the XOY plane at the first reference time point (or the second reference time point) is 0. However, this embodiment of the present disclosure is not limited hereto. The first reference angle and the second reference angle can also other values. When the first reference angle is the same as the second reference angle and the rotational speeds of the rotary laser plane transmitters A and B are the same, the first reference time point and the second reference time point are the same time point. Herein, when there are a plurality of first reference time points and/or second reference time points, the first one among the plurality of first reference time points in time sequence and/or the first one among the plurality of second reference time points in time sequence is, for example, a base time point.

Specifically, each time the rotating laser plane transmitter A (or B) of the locating base station transmits a laser plane signal by rotating to a first reference angle (or a second reference angle), the locating base station transmits, via a first synchronization apparatus (such as a radio Communication circuit), the first reference time point (or the second reference time point) to the label device to be located. Herein, with reference to FIG. 4, when the first reference angle is 0 (that is, the included angle between the rotation plane S1 and the XOY plane is 0), the first laser plane signal is taken as an example for description. The first rotation angle α is the included angle between the rotation plane S1 and the XOY plane. The computing device can determine the first rotation angle according to the following formula when the rotating laser plane transmitter A of the locating base station rotationally sends the first laser plane signal clockwise about the X axis to send:

$$\frac{(T_1 - T_{0(N)})w_1}{(T_{0(N)} - T_{0(N-1)})w_1} = \frac{360 - \alpha}{360};$$

When the rotating laser plane transmitter A of the locating base station rotationally sends the first laser plane signal counterclockwise about the X axis, the computing device may determine the first rotation angle according to the following formula:

$$\frac{(T_1 - T_{0(N)})w_1}{(T_{0(N)} - T_{0(N-1)})w_1} = \frac{\alpha}{360};$$

where α is the first rotation angle, $T_1$ is the time point at which the label device to be located detects the first laser plane signal, $T_{0(N)}$ is the first reference time point received by the label device to be located from the locating base station last time (for example, in case of a plurality of first reference time points, the N-th first reference time point in time sequence), $T_{0(N-1)}$ is the first reference time point received by the label device to be located from the locating base station the time previously before last time (for example, in case of a plurality of first reference time points, the (N−1)-th first reference time point in time sequence), w1 is a the rotation speed of rotational laser plane transmitter A of a locating base station.

Similarly, the second rotation angle β is an included angle between the rotation plane S2 and the XOY plane, and determined in a manner similar to that for the first rotation angle, thus not described herein again. It should be noted that, when the rotation speeds w1 and w2 are different or the first reference angle and the second reference angle corresponding to the rotating laser plane transmitters A and B are different from each other, thus rendering the first reference time point different from the second reference time point, the locating base station needs to send the first reference time point and the second reference time point to the label device to be located respectively.

In addition, the computing device may determine the distance between the label device to be located and the locating base station according to the following formula:

$$L = (T_3 - T_0') \times v;$$

where L is the distance between the label device to be located and the locating base station, $T_3$ is the time point at which the label device to be located detects the ultrasonic signal, $T_0'$ is the sending time point at which the locating base station sends the ultrasonic signal, v is the propagation speed of sound in air, where v is about 340 m/s under 1 standard atmospheric pressure and temperature of 15° C.

It should be noted that, in case where there are a plurality of first reference time points and second reference time points, the sending time point at which the first one of the plurality of first reference time points in time sequence is sent, the sending time point at which the first one of the plurality of second reference time points in time sequence is sent, and the sending time point at which the ultrasonic signal is sent may be same (e.g. as the base time point) or different. This embodiment is not limited hereto.

After obtaining the first rotation angle, the second rotation angle, and the distance between the label device to be located and the locating base station, the computing device can obtain the three-dimensional coordinates of the label device to be located in the three-dimensional measurement coordinate system according to the following formula:

$$X_0^2 + Y_0^2 + Z_0^2 = L^2$$

$$Y_0 \times \tan \alpha = X_0 \times \tan \beta = Z_0$$

where ($X_0$, $Y_0$, $Z_0$) represents the three-dimensional coordinates of the label device to be located in the three-dimensional measurement coordinate system, L is the distance between the label device to be located and the locating base station, α is the first rotation angle, and β is the second rotation angle.

To sum up, an embodiment of the present disclosure enables accurate indoor locating based on ultrasonic and laser signals. In an embodiment of the present disclosure, synchronization and timing information transmission between the locating base station and the label device to be located are performed by a synchronization apparatus (such as a radio communication circuit), enabling supporting paired use of the locating base station and the label device to be located in further support of extension application of multiple base stations. Moreover, the label device to be located provided in this embodiment has lower cost, is easy to be miniaturized, and has widened the application scenario.

Figure 5:
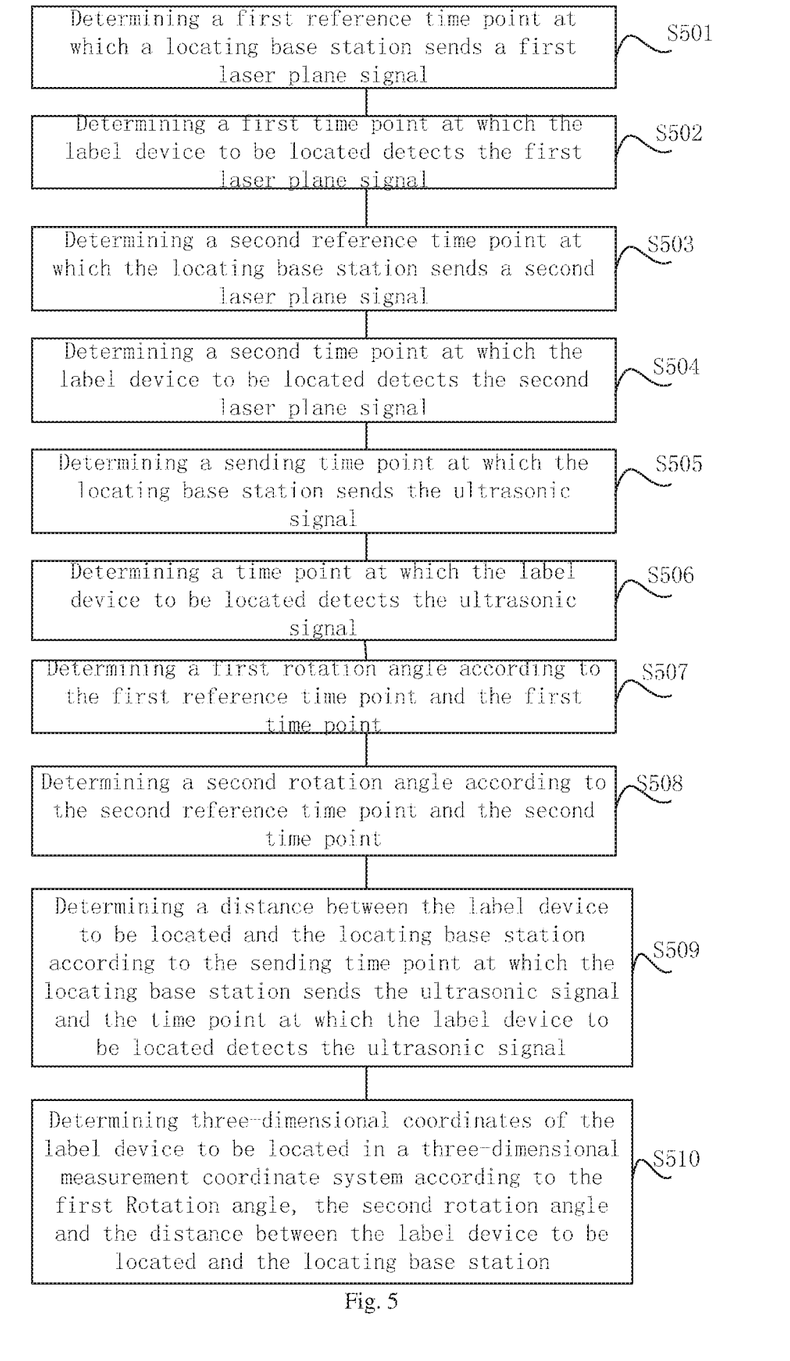
FIG. 5 is a flow chart of a three-dimensional space locating method according to an embodiment of the present disclosure.

To sum up, as shown in FIG. 5, according to an embodiment of this disclosure, there is provided a three-dimensional space locating method, comprising:

Step S501: determining a first reference time point at which a locating base station sends a first laser plane signal;

Step S502: determining a first time point at which the label device to be located detects the first laser plane signal, wherein the first laser plane signal rotates around a first rotation axis;

Step S503: determining a second reference time point at which the locating base station sends a second laser plane signal;

Step S504: determining a second time point at which the label device to be located detects the second laser plane signal, wherein the second laser plane signal rotates around a second rotation axis;

Step S505: determining a sending time point at which the locating base station sends the ultrasonic signal;

Step S506: determining a time point at which the label device to be located detects the ultrasonic signal;

Step S507: determining a first rotation angle according to the first reference time point and the first time point, wherein the first rotation angle is an angle of the first laser plane signal with respect to a plane defined by the first rotation axis and the second rotation axis at the first time point;

Step S508: determining a second rotation angle according to the second reference time point and the second time point, wherein the second rotation angle is an angle of the second laser plane signal with respect to a plane defined by the first rotation axis and the second rotation axis at the second time point;

Step S509: determining a distance between the label device to be located and the locating base station according to the sending time point at which the locating base station sends the ultrasonic signal and the time point at which the label device to be located detects the ultrasonic signal;

Step S510: determining three-dimensional coordinates of the label device to be located in a three-dimensional measurement coordinate system according to the first rotation angle, the second rotation angle and the distance between the label device to be located and the locating base station.

In an embodiment, the first rotation axis and the second rotation axis are perpendicular to each other.

In an embodiment, step S507 comprises:

determining, according to the first reference time and the first time, a relationship between the first reference time point and the first time point; determining, according to the relationship between the first reference time and the first time, and a first reference angle corresponding to the first reference time point, the first rotation angle, wherein the first reference angle is an angle of the first laser plane signal with respect to the plane defined by the first rotation axis and the second rotation axis at the first reference time point.

In an embodiment, step S508 comprises:

determining, according to the second reference time point and the second time point a relationship between the second reference time point and the second time point; determining the second rotation angel according to the relationship between the second reference time point and the second time point and a second reference angle corresponding to the second reference time point, wherein the second reference angle is an angle of the second laser plane signal with respect to the plane defined by the first rotation axis and the second rotation axis at the second reference time point.

In an embodiment, the method, further comprising: synchronizing the reference time point between the locating base station and the label device to be located.

In an embodiment, step S509 comprises:

determining transmission time length of the ultrasonic signal from the locating base station to the label device to be located according to a sending time point at which the locating base station sends the ultrasonic signal and a time point at which the label device to be located detects the ultrasonic signal; and determining the distance between the label device to be located and the locating base station according to the transmission time length and transmission speed of sound in air.

In an embodiment, step S510 includes:

when the three-dimensional measurement coordinate system is a Cartesian coordinate system, the first rotation axis is the X-axis, and the second rotation axis is the Y-axis, determining the three-dimensional coordinates of the label device to be located in the three-dimensional measurement coordinate system according to the following formula:

$$X_0^2+Y_0^2+Z_0^2=L^2$$

$$Y_0 \times \tan \alpha = X_0 \times \tan \beta = Z_0$$

wherein $(X_0, Y_0, Z_0)$ represents the three-dimensional coordinates of the label device to be located in the three-dimensional measurement coordinate system, L is the distance between the label device to be located and the locating base station, $\alpha$ is the first rotation angle, and $\beta$ is the second rotation angle.

Figure 6:
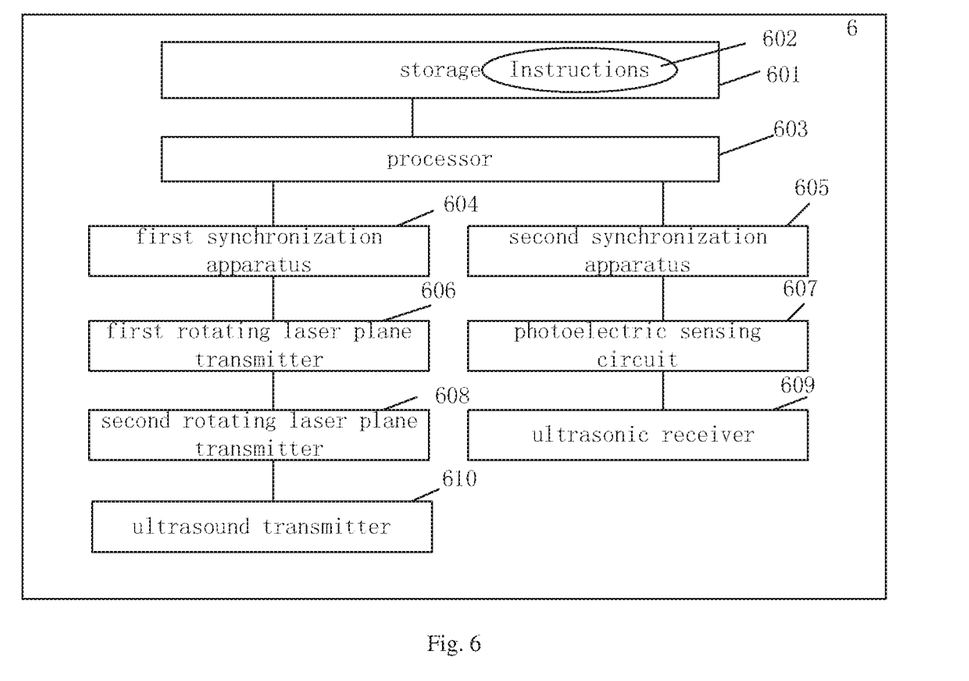
FIG. 6 is a hardware structure diagram of a three-dimensional space locating device according to an embodiment of the present disclosure.

Further, as shown in FIG. 6, there is provided a three-dimensional space locating device 6 comprising a storage 601 and a processor 603. Instructions 602 are stored in the storage 601 and ran by the processor 603, and used by the processor 603 to be loaded to perform the steps of:

determining a first reference time point at which a locating base station sends a first laser plane signal;

determining a first time point at which the label device to be located detects the first laser plane signal, wherein the first laser plane signal rotates around a first rotation axis;

determining a second reference time point at which the locating base station sends a second laser plane signal;

determining a second time point at which the label device to be located detects the second laser plane signal, wherein the second laser plane signal rotates around a second rotation axis;

determining a sending time point at which the locating base station sends the ultrasonic signal;

determining a time point at which the label device to be located detects the ultrasonic signal;

determining a first rotation angle according to the first reference time point and the first time point, wherein the first rotation angle is an angle of the first laser plane signal with respect to a plane defined by the first rotation axis and the second rotation axis at the first time point;

determining a second rotation angle according to the second reference time point and the second time point, wherein the second rotation angle is an angle of the second laser plane signal with respect to a plane defined by the first rotation axis and the second rotation axis at the second time point;

determining a distance between the label device to be located and the locating base station according to the sending time point at which the locating base station sends the ultrasonic signal and the time point at which the label device to be located detects the ultrasonic signal;

determining three-dimensional coordinates of the label device to be located in a three-dimensional measurement coordinate system according to the first rotation angle, the second rotation angle and the distance between the label device to be located and the locating base station.

In an embodiment, the determining the first rotation angle according to the first reference time point and the first time point comprises:

determining, according to the first reference time and the first time, a relationship between the first reference time point and the first time point; determining, according to the relationship between the first reference time and the first time, and a first reference angle corresponding to the first reference time point, the first rotation angle, wherein the first reference angle is an angle of the first laser plane signal with respect to the plane defined by the first rotation axis and the second rotation axis at the first reference time point.

In an embodiment, the determining the second rotation angle according to the second reference time point and the second time point comprises:

determining, according to the second reference time point and the second time point, a relationship between the second reference time point and the second time point; determining the second rotation angel according to the relationship between the second reference time point and the second time point and a second reference angle corresponding to the second reference time point, wherein the second reference angle is an angle of the second laser plane signal with respect to the plane defined by the first rotation axis and the second rotation axis at the second reference time point.

In an embodiment, the first rotation axis and the second rotation axis are perpendicular to each other.

In an embodiment, the determining the distance between the label device to be located and the locating base station comprises:

determining transmission time length of the ultrasonic signal from the locating base station to the label device to be located according to a sending time point at which the locating base station sends the ultrasonic signal and a time point at which the label device to be located detects the ultrasonic signal; and determining the distance between the label device to be located and the locating base station according to the transmission time length and transmission speed of sound in air.

In an embodiment, the determining the three-dimensional coordinates of the label device to be located in the three-dimensional measurement coordinate system according to the first rotation angle, the second rotation angle, and the distance between the label device to be located and the locating base station includes:

when the three-dimensional measurement coordinate system is a Cartesian coordinate system, the first rotation axis is the X-axis, and the second rotation axis is the Y-axis, determining the three-dimensional coordinates of the label device to be located in the three-dimensional measurement coordinate system according to the following formula:

$X_0^2 + Y_0^2 + Z_0^2 = L^2$ $Y_0 \times \tan \alpha = X_0 \times \tan \beta = Z_0$ wherein $(X_0, Y_0, Z_0)$ represents the three-dimensional coordinates of the label device to be located in the three-dimensional measurement coordinate system, L is the distance between the label device to be located and the locating base station, $\alpha$ is the first rotation angle, and $\beta$ is the second rotation angle.

According to an embodiment of this disclosure, there is provided a locating base station, comprising:

a first rotating laser plane transmitter configured to rotationally sending the first laser plane signal about the first rotation axis, wherein a first rotation angle is determined according to the first reference time point at which the locating base station sends a first laser plane signal and the first time point at which a label device to be located detects the first laser plane signal, wherein the first rotation angle is an angle of the first laser plane signal with respect to a plane defined by the first rotation axis and the second rotation axis at the first time point;

a second rotating laser plane transmitter configured to rotationally send the second laser plane signal about the second rotation axis, wherein a second rotation angle is determined according to the second reference time point at which the locating base station sends a second laser plane signal and the second time point at which the label device to be located detects the second laser plane signal, wherein the second rotation angle is an angle of the second laser plane signal with respect to a plane defined by the first rotation axis and the second rotation axis at the second time point; and an ultrasound transmitter, configured to send the ultrasonic signal, wherein a distance between the label device to be located and the locating base station is determined according to the sending time point at which the locating base station sends the ultrasonic signal and the time point at which the label device to be located detects the ultrasonic signal, and three-dimensional coordinates of the label device to be located in a three-dimensional measurement coordinate system is determined according to the first rotation angle, the second rotation angle and the distance between the label device to be located and the locating base station.

In an embodiment, the locating base station further comprises:

a first synchronization apparatus, configured to synchronize the base time point to the label device to be located;

In an embodiment, the ultrasound transmitter is located at the intersection of the first rotation axis and the second rotation axis.

In an embodiment, the first rotation angle is determined according to the first reference time point and the first time point by:

determining, according to the first reference time and the first time, a relationship between the first reference time point and the first time point; determining, according to the relationship between the first reference time and the first time, and a first reference angle corresponding to the first reference time point, the first rotation angle, wherein the first reference angle is an angle of the first laser plane signal with respect to the plane defined by the first rotation axis and the second rotation axis at the first reference time point.

In an embodiment, the second rotation angle is determined according to the second reference time point and the second time point by:

determining, according to the second reference time point and the second time point a relationship between the second reference time point and the second time point; determining the second rotation angel according to the relationship between the second reference time point and the second time point and a second reference angle corresponding to the second reference time point, wherein the second reference angle is an angle of the second laser plane signal with respect to the plane defined by the first rotation axis and the second rotation axis at the second reference time point.

In an embodiment, the distance between the label device to be located and the locating base station is determined by:

determining transmission time length of the ultrasonic signal from the locating base station to the label device to be located according to a sending time point at which the locating base station sends the ultrasonic signal and a time point at which the label device to be located detects the ultrasonic signal; and determining the distance between the label device to be located and the locating base station according to the transmission time length and transmission speed of sound in air.

In an embodiment, the three-dimensional coordinates of the label device to be located in the three-dimensional measurement coordinate system are determined according to the first rotation angle, the second rotation angle, and the distance between the label device to be located and the locating base station by:

when the three-dimensional measurement coordinate system is a Cartesian coordinate system, the first rotation axis is the X-axis, and the second rotation axis is the Y-axis, determining the three-dimensional coordinates of the label device to be located in the three-dimensional measurement coordinate system according to the following formula:

$$X_0^2 + Y_0^2 + Z_0^2 = L^2$$

$$Y_0 \times \tan \alpha = X_0 \times \tan \beta = Z_0$$

wherein ($X_0$, $Y_0$, $Z_0$) represents the three-dimensional coordinates of the label device to be located in the three-dimensional measurement coordinate system, L is the distance between the label device to be located and the locating base station, α is the first rotation angle, and β is the second rotation angle.

Figure 7:
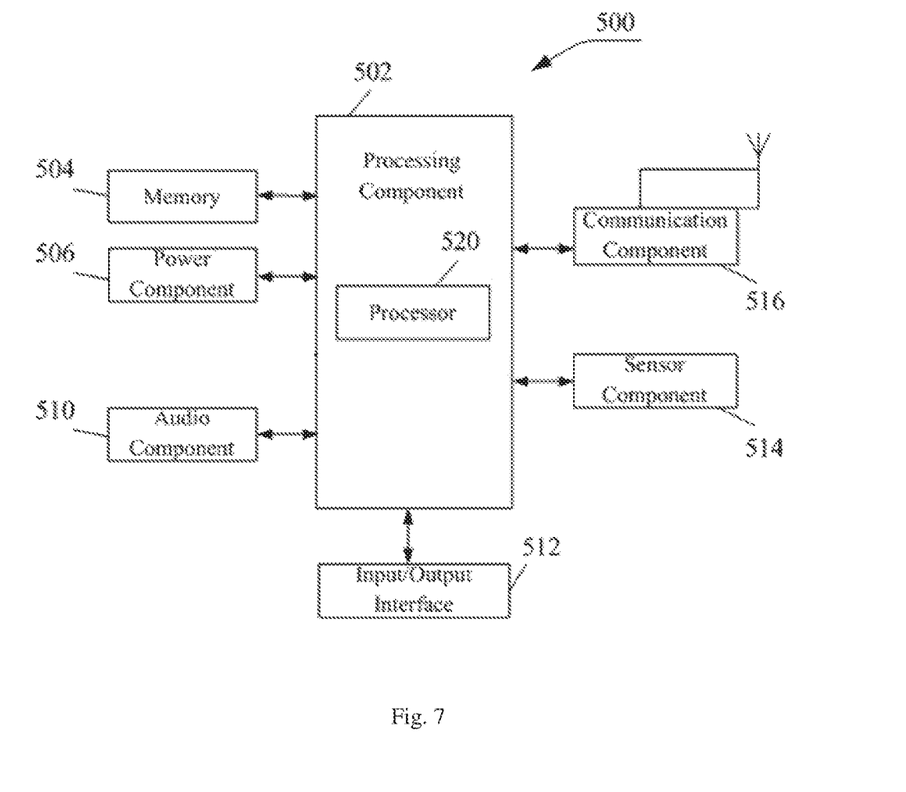
FIG. 7 is a hardware structure diagram of the locating base station or the label device to be located according to an embodiment of the present disclosure.

FIG. 7 is a hardware structure diagram of the locating base station or the label device to be located according to an embodiment of the present disclosure. Referring to FIG. 7, the locating base station or the label device to be located 500 may include one or more of the following components: a processing component 502, a memory 504, a power component 506, an audio component 510, an input/output (I/O) interface 512, a sensor component 514, and a communication component 516.

The processing component 502 typically controls overall operations of the terminal 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components.

The memory 504 is configured to store various types of data to support the operation of the terminal 500. Examples of such data include instructions for any applications or methods operated on the device 500, contact data, phonebook data, messages, pictures, video, etc. The memory 504 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the terminal 500. The power component 506 may include a power management system, one or more power sources, and any other components associated with the generation, management, and distribution of power in the terminal 500.

The audio component 510 is configured to output and/or input audio signals. For example, the audio component 510 includes a microphone ("MIC") configured to receive an external audio signal when the terminal 500 is in an operation mode, such as a call mode, a recording mode, and a voice recognition mode. The received audio signal may be further stored in the memory 504 or transmitted via the communication component 516.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the terminal 500. For instance, the sensor component 514 may detect an open/closed status of the terminal 500, relative positioning of components, e.g., the display and the keypad, of the terminal 500, a change in position of the terminal 500 or a component of the terminal 500, a presence or absence of user contact with the terminal 500, an orientation or an acceleration/deceleration of the terminal 500, and a change in temperature of the terminal 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate wired or wireless communication, between the terminal 500 and other devices. The terminal 500 can access a wireless network based on a communication standard, such as WiFi, 2G, or 3G, or a combination thereof.

In exemplary embodiments, the terminal 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 504, executable by the processor 520 in the terminal 500, for performing the above-described methods. For example, the non-transitory computer-readable storage medium may be a ROM, a RAM, a CD-ROM, a magnetic tape, a floppy disc, an optical data storage device, and the like.

Another embodiment of the present disclosure also provides a non-transitory computer-readable storage medium, when instructions in the storage medium are executed by the processor of the terminal, enables the label device to be located to perform the above mentioned method.

It should be understood by those ordinary skilled in the art that all or part of the steps in the foregoing methods may be implemented by a program instructing a relevant hardware (for example, a processor), wherein the program may be stored in a computer-readable storage medium, such as a read-only memory, a magnetic disk, a CD. Optionally, all or part of the steps of the above embodiments may also be implemented by using one or more integrated circuits. Correspondingly, each module/unit in the above embodiments can be implemented in the form of hardware such as an integrated circuit. Each module/unit in the above embodiments can be implemented in the form of a software function module. For example, the corresponding function is realized by a processor performing programs/instructions stored in the storage. The disclosure is not limited to any particular form of combination of hardware and software.

It should be understood by those ordinary skilled in the art that, modification or equivalence to the technical solution in the disclosure without departing from the spirit and scope of the technical solution of the present disclosure should all fall within the scope of the claims of the present disclosure.

INDUSTRIAL PRACTICABILITY

The above technical solution can perform indoor locating and has high locating accuracy. Moreover, the above technical solution is less costly for locating, the design of the label device to be located can be easy to be miniaturized, and can thus be advantageously applied to scenarios that are sensitive to volume or weight, such as a small drone, a smart robot, a virtual reality interaction, action capture and so on.

What is claimed is:

1. A three-dimensional space locating method, comprising:
   determining a first reference time point at which a locating base station sends a first laser plane signal;
   determining a first time point at which the label device to be located detects the first laser plane signal, wherein the first laser plane signal rotates around a first rotation axis;
   determining a second reference time point at which the locating base station sends a second laser plane signal;
   determining a second time point at which the label device to be located detects the second laser plane signal, wherein the second laser plane signal rotates around a second rotation axis, and the first rotation axis and the second rotation axis are perpendicular to each other;
   determining a sending time point at which the locating base station sends an ultrasonic signal;
   determining a time point at which the label device to be located detects the ultrasonic signal;
   determining a first rotation angle according to the first reference time point and the first time point, wherein the first rotation angle is an angle of the first laser plane signal with respect to a plane defined by the first rotation axis and the second rotation axis at the first time point;
   determining a second rotation angle according to the second reference time point and the second time point, wherein the second rotation angle is an angle of the second laser plane signal with respect to a plane defined by the first rotation axis and the second rotation axis at the second time point;
   determining a distance between the label device to be located and the locating base station according to the sending time point at which the locating base station sends, via an ultrasound transmitter, the ultrasonic signal and the time point at which the label device to be located detects the ultrasonic signal; and
   determining three-dimensional coordinates of the label device to be located in a three-dimensional measurement coordinate system according to the first rotation angle, the second rotation angle and the distance between the label device to be located and the locating base station, wherein the first rotation axis and the second rotation axis are coordinate axes of the three-dimensional measurement coordinate system, and the ultrasonic transmitter is located at the origin of the three-dimensional measurement coordinate system.

2. The method according to claim 1, wherein the determining the first rotation angle according to the first reference time point and the first time point comprises:
   determining, according to the first reference time and the first time, a relationship between the first reference time point and the first time point; determining, according to the relationship between the first reference time and the first time, and a first reference angle corresponding to the first reference time point, the first rotation angle, wherein the first reference angle is an angle of the first laser plane signal with respect to the plane defined by the first rotation axis and the second rotation axis at the first reference time point.

3. The method according to claim 1, wherein the determining the second rotation angle according to the second reference time point and the second time point comprises:
   determining, according to the second reference time point and the second time point a relationship between the second reference time point and the second time point; and
   determining the second rotation angel according to the relationship between the second reference time point and the second time point and a second reference angle corresponding to the second reference time point, wherein the second reference angle is an angle of the second laser plane signal with respect to the plane defined by the first rotation axis and the second rotation axis at the second reference time point.

4. The method according to claim 1, further comprising: synchronizing the base time point between the locating base station and the label device to be located.

5. The method according to claim 1, wherein the determining the distance between the label device to be located and the locating base station comprises:
   determining transmission time length of the ultrasonic signal from the locating base station to the label device to be located according to a sending time point at which the locating base station sends the ultrasonic signal and a time point at which the label device to be located detects the ultrasonic signal; and
   determining the distance between the label device to be located and the locating base station according to the transmission time length and transmission speed of sound in air.

6. The method according to claim 1, wherein the determining the three-dimensional coordinates of the label device to be located in the three-dimensional measurement coordinate system according to the first rotation angle, the second rotation angle, and the distance between the label device to be located and the locating base station includes:
   when the three-dimensional measurement coordinate system is a Cartesian coordinate system, the first rotation axis is the X-axis, and the second rotation axis is the Y-axis, determining the three-dimensional coordinates of the label device to be located in the three-dimensional measurement coordinate system according to the following formula:

$$X_0^2+Y_0^2+Z_0^2=L^2$$

$$Y_0 \times \tan \alpha = X_0 \times \tan \beta = Z_0$$

wherein $(X_0, Y_0, Z_0)$ represents the three-dimensional coordinates of the label device to be located in the three-dimensional measurement coordinate system, L is the distance between the label device to be located and the locating base station, $\alpha$ is the first rotation angle, and $\beta$ is the second rotation angle.

7. A three-dimensional space locating device comprising a storage, a processor and instructions stored in the storage and ran by the processor, the instructions being used by the processor to be loaded to perform the steps of:
   determining a first reference time point at which a locating base station sends a first laser plane signal;
   determining a first time point at which the label device to be located detects the first laser plane signal, wherein the first laser plane signal rotates around a first rotation axis;
   determining a second reference time point at which the locating base station sends a second laser plane signal;
   determining a second time point at which the label device to be located detects the second laser plane signal, wherein the second laser plane signal rotates around a second rotation axis, and the first rotation axis and the second rotation axis are perpendicular to each other;
   determining a sending time point at which the locating base station sends the ultrasonic signal;
   determining a time point at which the label device to be located detects the ultrasonic signal;
   determining a first rotation angle according to the first reference time point and the first time point, wherein the first rotation angle is an angle of the first laser plane signal with respect to a plane defined by the first rotation axis and the second rotation axis at the first time point;
   determining a second rotation angle according to the second reference time point and the second time point, wherein the second rotation angle is an angle of the second laser plane signal with respect to a plane defined by the first rotation axis and the second rotation axis at the second time point;
   determining a distance between the label device to be located and the locating base station according to the sending time point at which the locating base station sends, via an ultrasound transmitter, the ultrasonic signal and the time point at which the label device to be located detects the ultrasonic signal; and
   determining three-dimensional coordinates of the label device to be located in a three-dimensional measurement coordinate system according to the first rotation angle, the second rotation angle and the distance between the label device to be located and the locating base station, wherein the first rotation axis and the second rotation axis are coordinate axes of the three-dimensional measurement coordinate system, and the ultrasonic transmitter is located at the origin of the three-dimensional measurement coordinate system.

8. The device according to claim 6, wherein the determining the first rotation angle according to the first reference time point and the first time point comprises:
   determining, according to the first reference time and the first time, a relationship between the first reference time point and the first time point; and
   determining, according to the relationship between the first reference time and the first time, and a first reference angle corresponding to the first reference time point, the first rotation angle, wherein the first reference angle is an angle of the first laser plane signal with respect to the plane defined by the first rotation axis and the second rotation axis at the first reference time point.

9. The device according to claim 6, wherein the determining the second rotation angle according to the second reference time point and the second time point comprises:
   determining, according to the second reference time point and the second time point, a relationship between the second reference time point and the second time point; and
   determining the second rotation angel according to the relationship between the second reference time point and the second time point and a second reference angle corresponding to the second reference time point, wherein the second reference angle is an angle of the second laser plane signal with respect to the plane defined by the first rotation axis and the second rotation axis at the second reference time point.

10. The device according to claim 6, wherein the determining the distance between the label device to be located and the locating base station comprises:
    determining transmission time length of the ultrasonic signal from the locating base station to the label device to be located according to a sending time point at which the locating base station sends the ultrasonic signal and a time point at which the label device to be located detects the ultrasonic signal; and
    determining the distance between the label device to be located and the locating base station according to the transmission time length and transmission speed of sound in air.

11. The device according to claim 6, wherein the determining the three-dimensional coordinates of the label device to be located in the three-dimensional measurement coordinate system according to the first rotation angle, the second rotation angle, and the distance between the label device to be located and the locating base station includes:
    when the three-dimensional measurement coordinate system is a Cartesian coordinate system, the first rotation axis is the X-axis, and the second rotation axis is the Y-axis, determining the three-dimensional coordinates of the label device to be located in the three-dimensional measurement coordinate system according to the following formula:

$$X_0^2+Y_0^2+Z_0^2=L^2$$

$$Y_0 \times \tan \alpha = X_0 \times \tan \beta = Z_0$$

wherein $(X_0, Y_0, Z_0)$ represents the three-dimensional coordinates of the label device to be located in the three-dimensional measurement coordinate system, L is the distance between the label device to be located and the locating base station, $\alpha$ is the first rotation angle, and $\beta$ is the second rotation angle.

12. A locating base station, comprising:
    a first rotating laser plane transmitter configured to rotationally sending the first laser plane signal about the first rotation axis, wherein a first rotation angle is determined according to the first reference time point at which the locating base station sends a first laser plane signal and the first time point at which a label device to be located detects the first laser plane signal, wherein the first rotation angle is an angle of the first laser plane signal with respect to a plane defined by the first rotation axis and the second rotation axis at the first time point, and the first rotation axis and the second rotation axis are perpendicular to each other;
a second rotating laser plane transmitter configured to rotationally send the second laser plane signal about the second rotation axis, wherein a second rotation angle is determined according to the second reference time point at which the locating base station sends a second laser plane signal and the second time point at which the label device to be located detects the second laser plane signal, wherein the second rotation angle is an angle of the second laser plane signal with respect to a plane defined by the first rotation axis and the second rotation axis at the second time point; and
an ultrasound transmitter, configured to send the ultrasonic signal, wherein a distance between the label device to be located and the locating base station is determined according to the sending time point at which the locating base station sends the ultrasonic signal and the time point at which the label device to be located detects the ultrasonic signal, three-dimensional coordinates of the label device to be located in a three-dimensional measurement coordinate system is determined according to the first rotation angle, the second rotation angle and the distance between the label device to be located and the locating base station, the first rotation axis and the second rotation axis are coordinate axes of the three-dimensional measurement coordinate system, and the ultrasound transmitter is located at the origin of the three-dimensional measurement coordinate system.

13. The locating base station according to claim 10, further comprising:
a first synchronization apparatus, configured to synchronize the base time point to the label device to be located.

14. The locating base station according to claim 10, wherein the first rotation angle is determined according to the first reference time point and the first time point by:
determining, according to the first reference time and the first time, a relationship between the first reference time point and the first time point; and
determining, according to the relationship between the first reference time and the first time, and a first reference angle corresponding to the first reference time point, the first rotation angle, wherein the first reference angle is an angle of the first laser plane signal with respect to the plane defined by the first rotation axis and the second rotation axis at the first reference time point.

15. The locating base station according to claim 10, wherein the second rotation angle is determined according to the second reference time point and the second time point by:
determining, according to the second reference time point and the second time point a relationship between the second reference time point and the second time point; and
determining the second rotation angel according to the relationship between the second reference time point and the second time point and a second reference angle corresponding to the second reference time point, wherein the second reference angle is an angle of the second laser plane signal with respect to the plane defined by the first rotation axis and the second rotation axis at the second reference time point.

16. The locating base station according to claim 10, wherein the distance between the label device to be located and the locating base station is determined by:
determining transmission time length of the ultrasonic signal from the locating base station to the label device to be located according to a sending time point at which the locating base station sends the ultrasonic signal and a time point at which the label device to be located detects the ultrasonic signal; and
determining the distance between the label device to be located and the locating base station according to the transmission time length and transmission speed of sound in air.

17. The locating base station according to claim 10, wherein the three-dimensional coordinates of the label device to be located in the three-dimensional measurement coordinate system are determined according to the first rotation angle, the second rotation angle, and the distance between the label device to be located and the locating base station by:
when the three-dimensional measurement coordinate system is a Cartesian coordinate system, the first rotation axis is the X-axis, and the second rotation axis is the Y-axis, determining the three-dimensional coordinates of the label device to be located in the three-dimensional measurement coordinate system according to the following formula:

$$X_0^2+Y_0^2+Z_0^2=L^2$$

$$Y_0 \times \tan \alpha = X_0 \times \tan \beta = Z_0$$

wherein $(X_0, Y_0, Z_0)$ represents the three-dimensional coordinates of the label device to be located in the three-dimensional measurement coordinate system, L is the distance between the label device to be located and the locating base station, $\alpha$ is the first rotation angle, and $\beta$ is the second rotation angle.

\* \* \* \* \*

UNITED STATES PATENT AND TRADEMARK OFFICE
CERTIFICATE OF CORRECTION

PATENT NO. : 10,962,633 B2  
APPLICATION NO. : 15/921331  
DATED : March 30, 2021  
INVENTOR(S) : Daoning Zhang Page 1 of 1

It is certified that error appears in the above-identified patent and that said Letters Patent is hereby corrected as shown below:

On the Title Page

Item (72), the place of residence of Inventor Daoning Zhang "Bejing (CN)" should be replaced with: --Beijing (CN)--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*